United States Patent
Zhang

(10) Patent No.: US 10,070,676 B2
(45) Date of Patent: Sep. 11, 2018

(54) SMART CAP AND VOICE CONTROLLING METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Xue-Qin Zhang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 100 days.

(21) Appl. No.: 15/227,965

(22) Filed: Aug. 4, 2016

(65) Prior Publication Data
US 2017/0280805 A1    Oct. 5, 2017

(30) Foreign Application Priority Data
Apr. 5, 2016    (CN) .......................... 2016 1 0207167

(51) Int. Cl.
| G10L 21/00 | (2013.01) |
| A42B 1/24 | (2006.01) |
| G06F 3/16 | (2006.01) |
| G06F 3/0488 | (2013.01) |
| G06F 3/0482 | (2013.01) |
| A42B 1/06 | (2006.01) |
| H04B 1/3816 | (2015.01) |
| G10L 15/26 | (2006.01) |
| G10L 15/22 | (2006.01) |

(52) U.S. Cl.
CPC .............. *A42B 1/245* (2013.01); *A42B 1/064* (2013.01); *G06F 3/0482* (2013.01); *G06F 3/0488* (2013.01); *G06F 3/167* (2013.01); *H04B 1/3816* (2013.01); *G10L 15/26* (2013.01); *G10L 2015/223* (2013.01)

(58) Field of Classification Search
CPC ....... A42B 1/244; A42B 3/0406; A42B 3/044; A42B 3/227; A42B 1/24
USPC ................ 704/275; 345/8, 633; 702/97, 158
See application file for complete search history.

(56) References Cited

U.S. PATENT DOCUMENTS

| 9,247,779 B1 * | 2/2016 | Aloumanis | ............ G08G 1/137 |
| 9,341,866 B2 * | 5/2016 | Carabajal | ................ G06F 3/011 |
| 2013/0278631 A1 * | 10/2013 | Border | ................ G02B 27/017 |
|  |  |  | 345/633 |

* cited by examiner

Primary Examiner — Charlotte M Baker
(74) Attorney, Agent, or Firm — ScienBiziP, P.C.

(57) ABSTRACT

A smart cap includes a fixing sleeve, a brim portion, and a sun visor. The fixing sleeve rotatably connects with one side of the brim portion, and the sun visor connects with another side of the brim portion which is relative to the one side of the brim portion. The fixing sleeve includes a voice inputting device, a voice outputting device, a communication device, and a SIM card. A motherboard running programs is configured on the brim portion, and an upper surface of the sun visor has a solar charging battery, a lower surface of the sun visor being a display screen. The solar charging battery provides power for all components of the smart cap via a power management device.

20 Claims, 8 Drawing Sheets

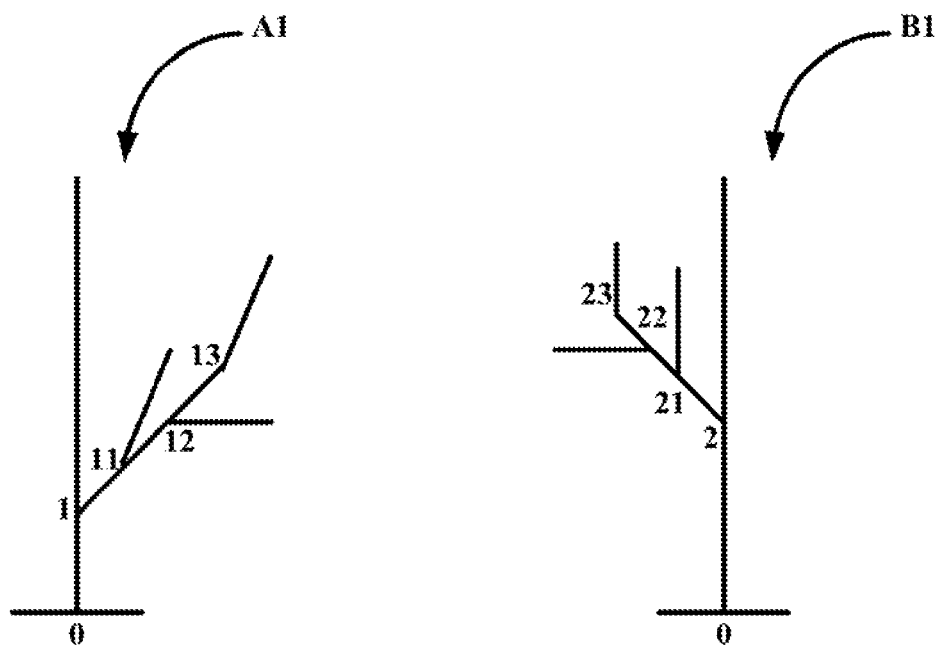
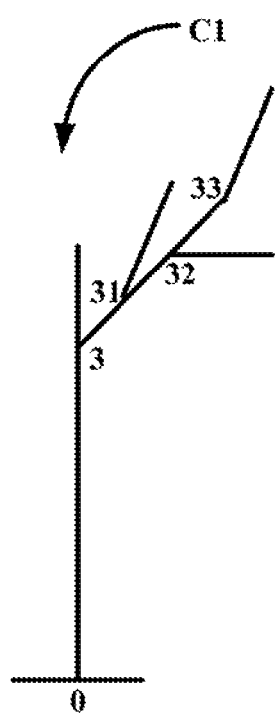
FIG. 6

SMART CAP AND VOICE CONTROLLING METHOD

CROSS-REFERENCE TO RELATED APPLICATIONS

This application claims priority to Chinese Patent Application No. 201610207167.4 filed on Apr. 5, 2016, the contents of which are incorporated by reference herein. This application is related to a commonly-assigned application entitled, "ELECTRONIC DEVICE AND VOICE CONTROLLING METHOD", Ser. No. 15/220,347 filed Jul. 26, 2016.

FIELD

The subject matter herein generally relates to a cap, and particularly to a smart cap.

BACKGROUND

Generally, when the sun is hot, a cap may be used to keep the sun off.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

FIG. 6 illustrates an example of establishing a single control tree for an application by the voice controlling system of FIG. 5.

DETAILED DESCRIPTION

Figure 1:
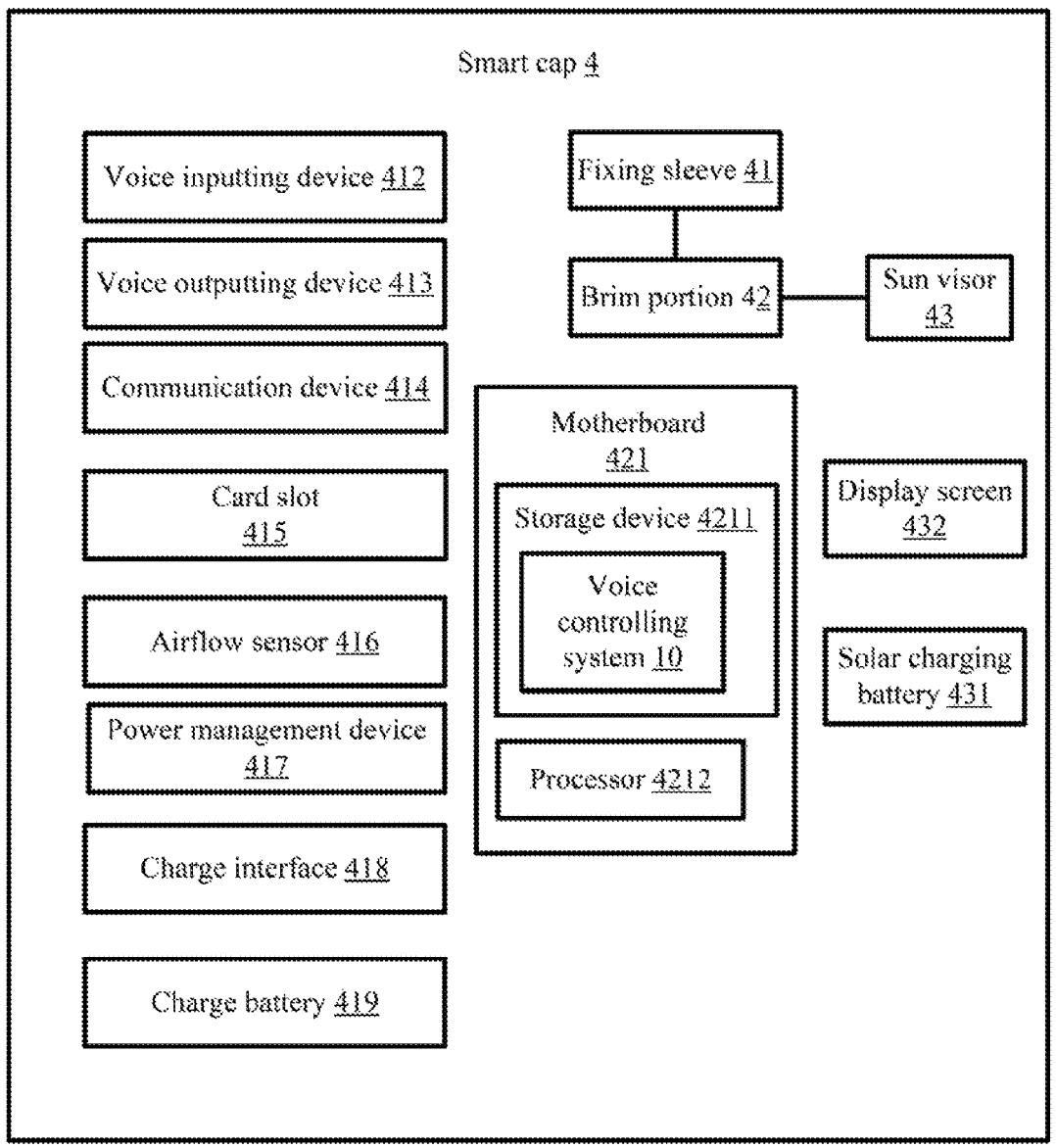
FIG. 1 illustrates one embodiment of hardware infrastructure of a smart cap.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

Figure 2:
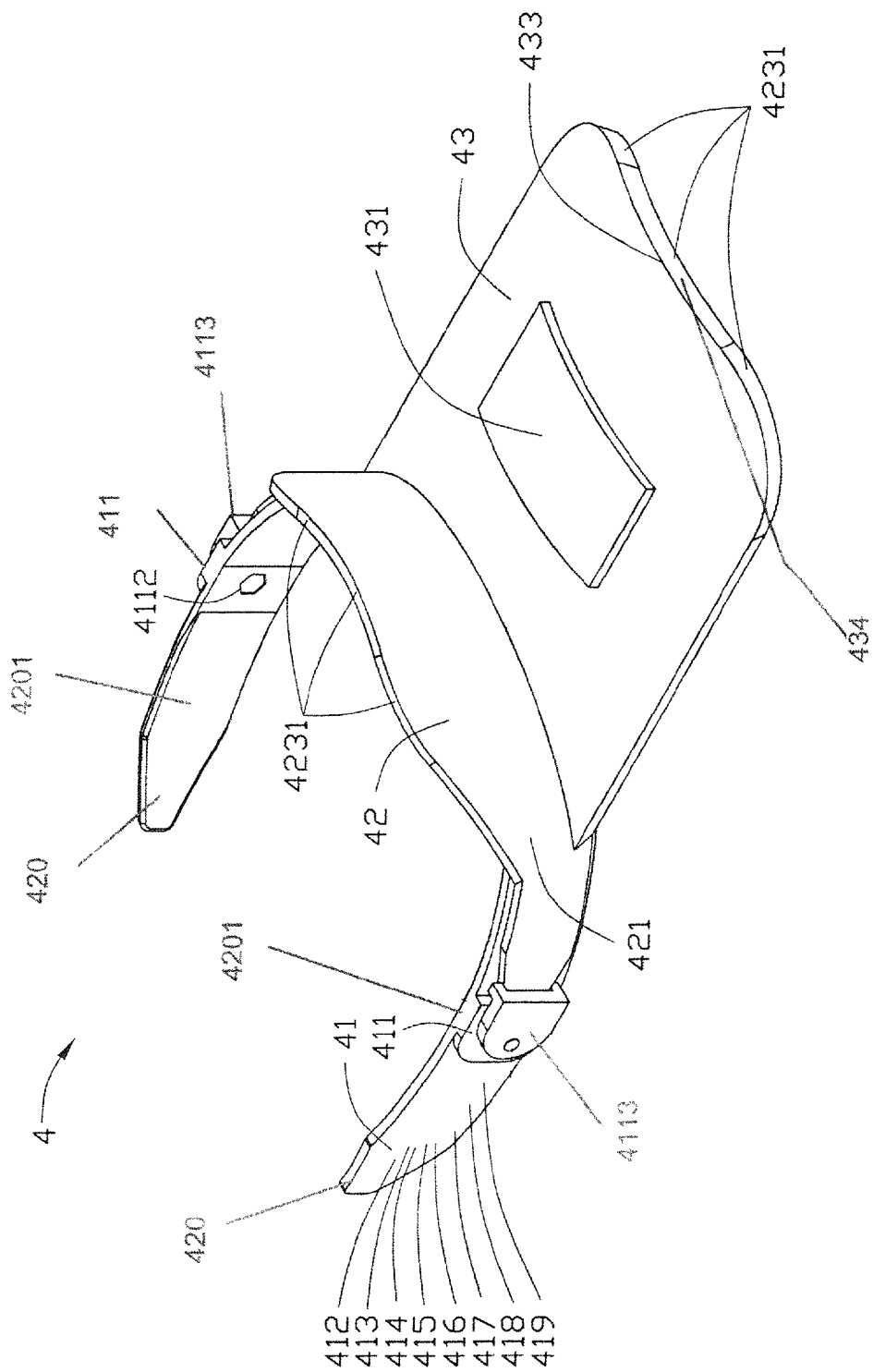
FIG. 2 illustrates a diagrammatic view showing one embodiment of the smart cap of FIG. 1.
Figure 3:
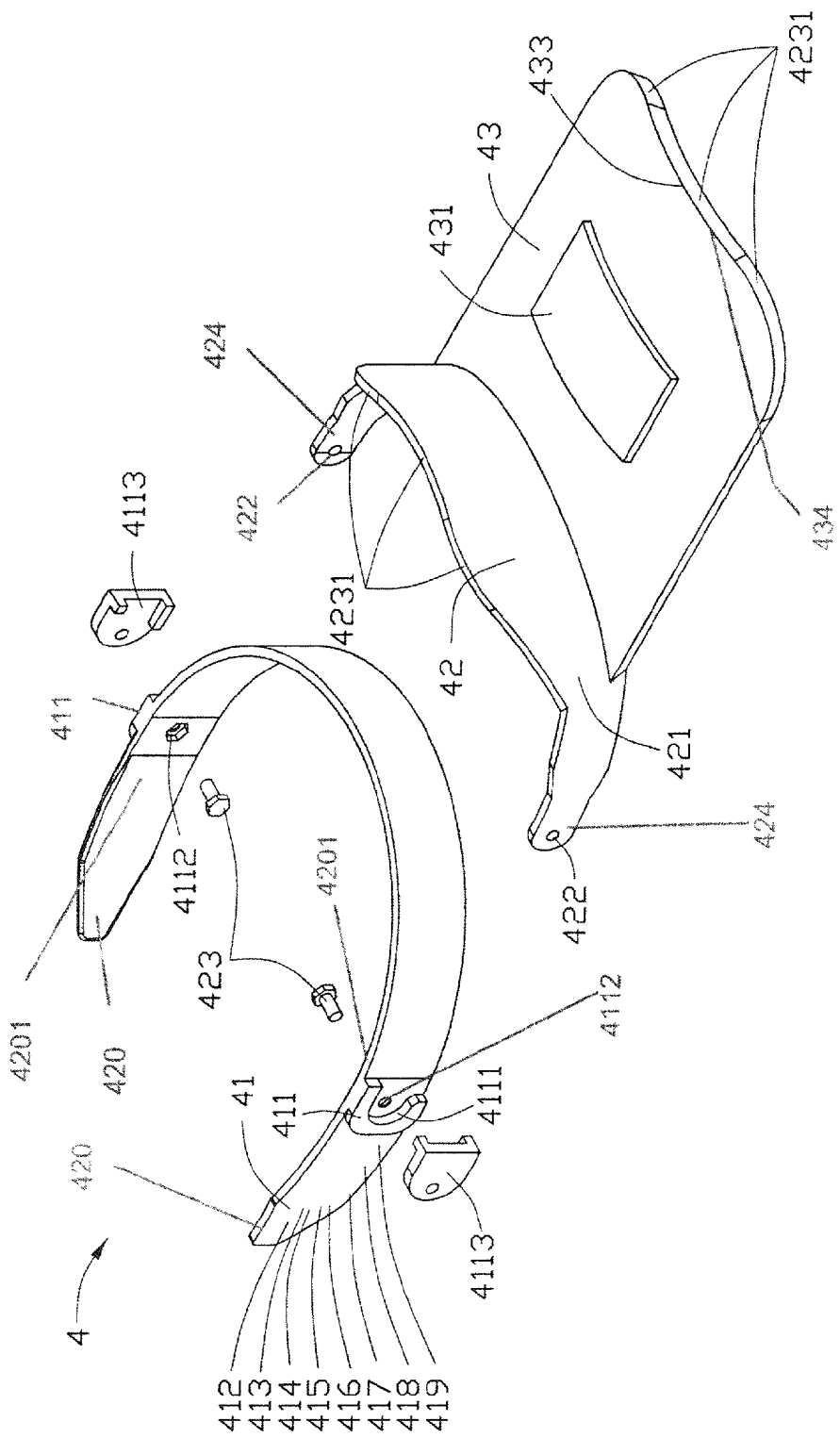
FIG. 3 illustrates an exploded diagram of one embodiment of the smart cap of FIG. 2.
Figure 4:
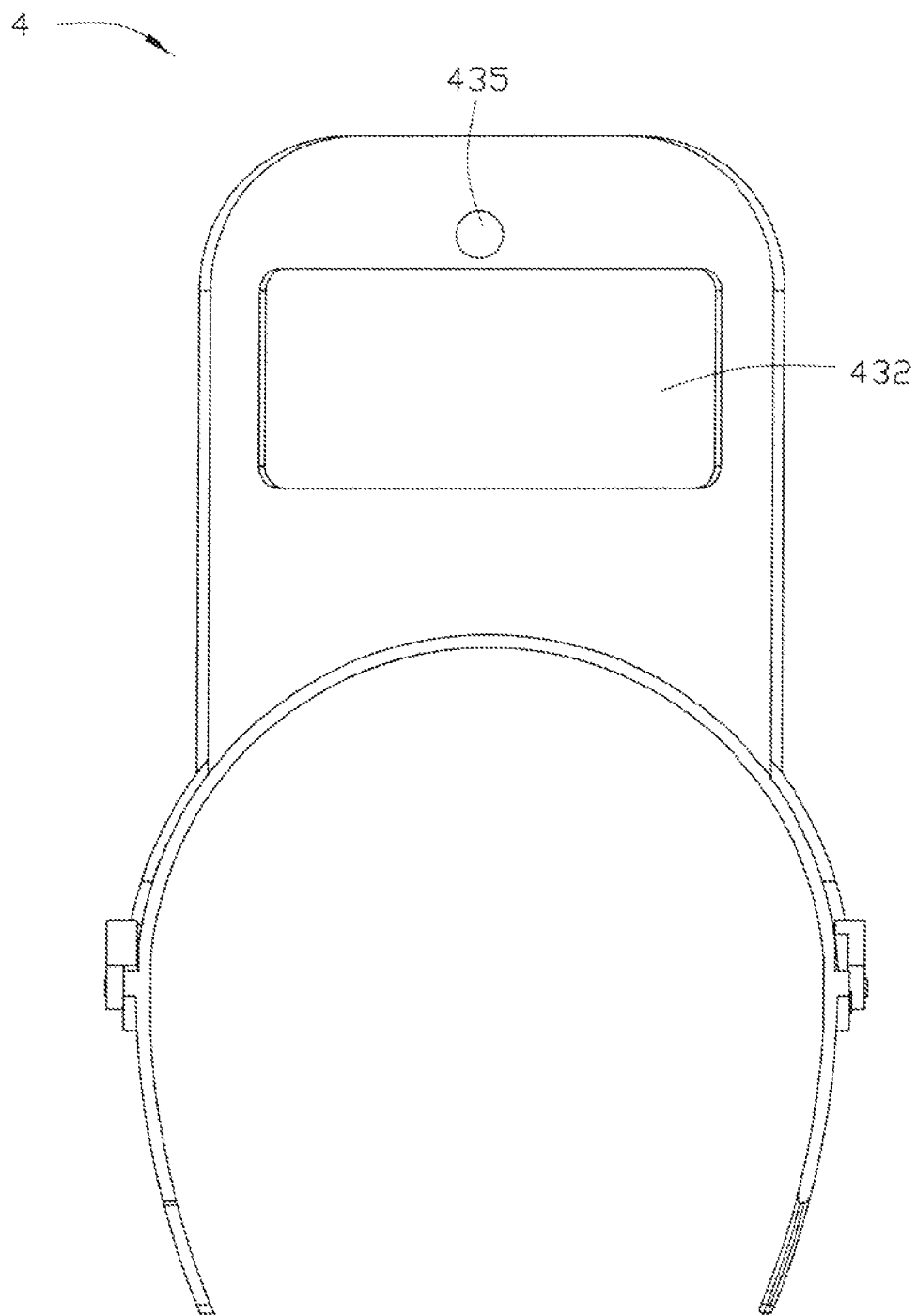
FIG. 4 illustrates a plan view of one embodiment of the smart cap of FIG. 2.

FIG. 1 illustrates one embodiment of hardware infrastructure of a smart cap. FIG. 2 is a diagrammatic view of one embodiment of the smart cap of FIG. 1. FIG. 3 is an exploded view of one embodiment of the smart cap of FIG. 2. FIG. 4 illustrates one embodiment of the smart cap of FIG. 2 from below.

Refer to FIGS. 1-4, depending on the embodiment, the smart cap 4 includes a fixing sleeve 41, a brim portion 42, and a sun visor 43. The fixing sleeve 41 rotatably connects with one side of the brim portion 42, and the sun visor 43 is set on another side of the brim portion 42. The another side of the brim portion 42 is relative to the one side of the brim portion 42. In at least one embodiment, the sun visor 43 is extended from the another side of the brim portion 42.

In at least one embodiment, the fixing sleeve 41 has a C-shape. The fixing sleeve 41 has two ends 4201. Each end 4201 has a tail end 420 with a shape of an isosceles trapezoid. It is convenient for a user to wear the smart cap 4 when the shape of each tail end 420 is the isosceles trapezoid. Further, material for making the fixing sleeve 41 can be saved under. In at least one embodiment, rigid plastics can be used as the material.

In at least one embodiment, the fixing sleeve 41 includes projections 411 configured on the two ends 4201 of the fixing sleeve 41. Each of the two projections 411 has a groove 4111. On each end 4201 of the fixing sleeve 41 a hole 4112 is opened to connect with the groove 4111. A tail end 424 of the brim portion 42 is inserted in each of the grooves 4111. In at least one embodiment, a hole 422 is opened on each tail end 424 of the brim portion 42. The brim portion 42 and the fixing sleeve 41 can be connected to each other by inserting a connecting pin 423 into the hole 422 of the brim portion 42 and the hole 4112 of the fixing sleeve 41.

In at least one embodiment, the groove 4111 may have a U-shape or an L-shape. As shown in FIG. 3, each projection 411 is further configured with a protective cover 4113. The projective cover 4113 can be used to prevent the brim portion 42 from falling off the fixing sleeve 41 when the brim portion 42 rotates relative to the fixing sleeve 41.

In at least one embodiment, the fixing sleeve 41 is further configured with a voice inputting device 412, a voice outputting device 413, a communication module 414, a card slot 415, an airflow sensor 416, and a power management device 417.

In at least one embodiment, the voice inputting device 412 can be a microphone. The voice outputting device 413 can be a speaker.

In at least one embodiment, the communication module 414 can be a WIFI device or a BLUETOOTH device.

In at least one embodiment, the card slot 415 may have a subscriber identity module (SIM) card for communicating with other devices. The card slot 415 can support various kinds of SIM cards such as Micro SIM cards, Nano SIM cards, and the like.

In at least one embodiment, the airflow sensor 416 is used to monitor airflow of a mouth and/or a nose of the user. In at least one embodiment, when the user wears the smart cap 4, a position of the airflow sensor 416 on the fixing sleeve 41 is near the mouth or the nose of the user. That is, the airflow sensor 416 can be set on a middle position of one of the two ends 4201 of the fixing sleeve 41.

In at least one embodiment, at least one of the two ends 4201 of the fixing sleeve 41 is configured with a charge interface 418. The charge interface 418 connects with a charge battery 419 that is configured on the fixing sleeve 41. Through the power management device 417, the charge battery 419 can provide power for all the components of the smart cap 4, such as the voice inputting device 412, the voice outputting device 413, the communication device 414, and the like.

In at least one embodiment, the brim portion 42 is further configured with a motherboard 421.

In at least one embodiment, at least one light-emitting diode (LED) light 4231 is configured on the fixing sleeve 42. In at least one embodiment, the at least one LED light 4231 is configured on an upper edge of the fixing sleeve 42.

In at least one embodiment, a solar charging battery 431 is configured on an upper surface of the sun visor 43, and a display screen 432 is configured on a lower surface of the sun visor 43. In at least one embodiment, the display screen 432 can be a normal display-only screen, or a touch screen.

In at least one embodiment, through the power management device 417, the solar charging battery 431 can provide power for all the components of the smart cap 4, such as the voice inputting device 412, the voice outputting device 413, the communication device 414, the motherboard 421, the at least one LED light 4231, and the like.

In at least one embodiment, at least one LED light 4231 and a camera 433 are configured on a middle position of a front edge 434 of the sun visor 43. In at least one embodiment, a button 435 which can activate the motherboard 421 is configured on the lower surface of the sun visor 43. The motherboard 421 can be activated by pressing or touching the button 435.

In at least one embodiment, the motherboard 421 includes a storage device 4211 and at least one processor 4212. In at least one embodiment, the storage device 4211 can be an internal storage device, such as a flash memory, a random access memory (RAM) for temporary storage of information, and/or a read-only memory (ROM) for permanent storage of information. The storage device 4211 can also be an external storage device, such as an external hard disk, a storage card, or a data storage medium. In at least one embodiment, the storage device 4211 stores a number of applications and a number of files. The number of applications may include, but is not limited to, a music player and a telephone application. The number of files may include, but is not limited to, audio files and video files. In at least one embodiment, the audio files can be popular songs. In at least one embodiment, the storage device 4211 further stores programs of a voice controlling system 10.

In at least one embodiment, the at least one processor 4212 can be a central processing unit (CPU), a microprocessor, or other data processor chip that performs functions of the smart cap 4.

In at least one embodiment, the voice controlling system 10 can be used to control the motherboard 421 to run according to voice data inputted through the voice inputting device 412. For example, the voice controlling system 10 can control the music player to switch from a first song to a second song.

In at least one embodiment, when airflow through the mouth or nose of the user is detected by the airflow sensor 416, the voice controlling system 10 can obtain voice data of the user from the voice inputting device 412, and control the motherboard 421 accordingly. In other embodiments, when the motherboard 421 does not include the airflow sensor 416, the voice controlling system 10 can directly obtain voice data from the voice inputting device 412.

It should be noted that the purpose of the voice controlling system 10 obtaining the voice data when the airflow is detected is for avoiding mistaken instructions. For example, when the airflow of the mouth and nose of the user is not taken into consideration, the voice controlling system 100 can directly obtain the voice data from the voice inputting device 412. If the voice data is inputted by a person around the smart cap 4 who is not the user, then the motherboard 421 is likely to be mistakenly controlled by the person that is around the smart cap 4. In other words, the voice controlling system 10 obtains the voice data when the airflow is detected can render the motherboard 421 being controlled more accurately.

Figure 5:
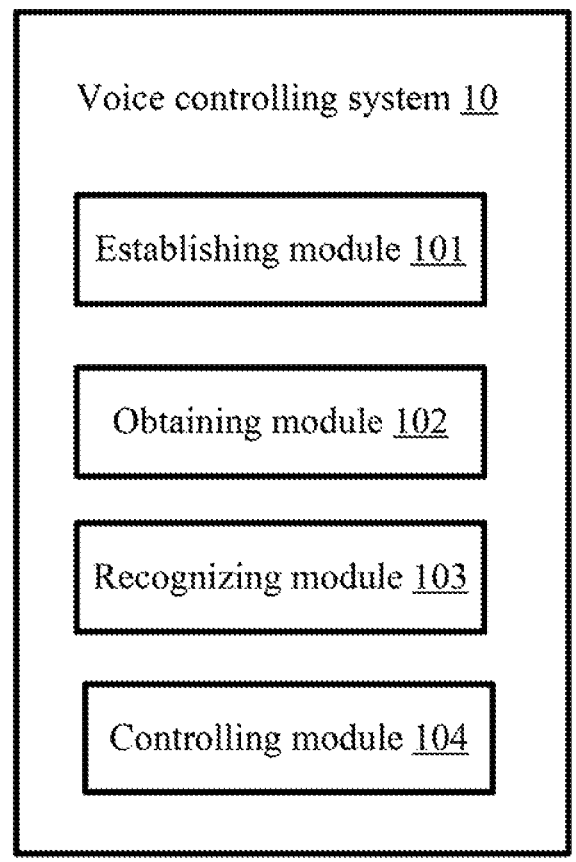
FIG. 5 illustrates one embodiment of modules of a voice controlling system applied in the smart cap of FIG. 1.

FIG. 5 shows one embodiment of modules of the voice controlling system 10. In at least one embodiment, the voice controlling system 10 can include an establishing module 101, an obtaining module 102, a recognizing module 103, and a control module 104. The modules 101-104 can include computerized codes in the form of one or more programs, which are stored in the storage device 4211 and are executed by the at least one processor 4212 of the motherboard 421.

In at least one embodiment, the establishing module 101 can establish a central control tree for the motherboard 421.

In at least one embodiment, the establishing module 101 can establish a single control tree for each of the number of applications of the motherboard 421 to obtain a number of single control trees. The establishing module 101 can further establish the central control tree by merging the number of single control trees according to a tree structure.

In at least one embodiment, a single control tree can be defined to be a rule used for controlling an application of the motherboard 421. Similarly, the central control tree can be defined to be a rule used for controlling operations performed by the motherboard 421. The rules can be set according to the tree structure that may be defined by a trunk of a tree, one or more branches of the trunk, and one or more leaves of each of the one or more branches.

In at least one embodiment, the establishing module 101 establishes the number of single control trees according to the following four steps.

First, the establishing module 101 sets first text information corresponding to a first function of the motherboard 421. The establishing module 101 creates a root node of a single control tree, and establishes a first relationship between the root node and the first text information.

In at least one embodiment, the first function includes, but is not limited to, a function of powering off the motherboard 421, a function of rebooting the motherboard 421, a function of locking the motherboard 421, a function of controlling the motherboard 421 to enter a sleep state, and the like. In other embodiments, the first function can be executed after a predetermined time period such as 5 minutes.

In at least one embodiment, the first text information can be information describing the first function. For example, when the first function is power off the motherboard 421, the first text information can be such as "power off the motherboard". In at least one embodiment, the establishing module 101 can set the first text function according to user's requirement. For example, the establishing module 101 can set the first text function in response to user's input through the display screen 432.

In at least one embodiment, the establishing module 101 can provide the user a setting interface for setting the first function and the corresponding first text information.

For example, on the setting interface, the user can set the first function including locking the display screen 432 of the motherboard 421. The user can further set the first text information including text "lock display screen".

Second, the establishing module 101 can set second text information corresponding to one of the number of applications. The establishing module 101 can further create a father node of the single control tree, and establish a second relationship between the second text information and the father node.

In at least one embodiment, the establishing module 101 can display icons of the number of applications on the setting interface when the first relationship is established. The establishing module 101 can set one of the number of applications is selected by the user in response to touch input received from the display screen 432.

In at least one embodiment, the establishing module 101 can set a name of the selected application to be text information corresponding to the selected application. For example, when the user selects the telephone application, the establishing module 101 can set "telephone" as the text information corresponding to the telephone application.

Third, the establishing module 101 can set a number of function options of the one of the number of applications, and set third text information corresponding to each of the number of function options. The establishing module 101 can create a number of child nodes for the father node according to a number of the number of function options. In at least one embodiment, a quantity of the number of the child nodes equals the quantity of the number of function options. The establishing module 101 can further establish a third relationship between each of the number of child node and corresponding third text information.

In at least one embodiment, when the second relationship is established, the establishing module 101 can display the number of function options on the setting interface, and determine the third text information corresponding to each of the number of function options, in response to user's input. In other embodiments, the establishing module 101 can determine a name of each of the number of function options to be the corresponding third text information.

For example, it is assumed that the telephone application is selected by the user. When the second relationship is established, the establishing module 101 can display the number of function options of the telephone application on the setting interface. The number of functions options of the telephone application may include, but is not limited to, a first function option of making a call, a second function option of querying all received calls, a third function option of querying all answered calls, and a fourth function option of querying missed calls. The establishing module 101 can set "make call" as the text information corresponding to the first function option. Similarly, the establishing module 101 can set "query received calls" as the text information corresponding to the second function option, set "query answered calls" as the text information corresponding to the third function option, and set "query missed calls" as the text information corresponding to the fourth function option.

Fourth, the establishing module 101 can establish a single control tree for each of other applications of the number of applications according to the above steps. Therefore, the establishing module 101 can obtain the number of single control trees, each of which corresponds to one of the number of the applications.

In at least one embodiment, the establishing module 101 can further set a serial number for each node (i.e., the root node, the father node, the child nodes) of each of the number of single control trees. In other words, the root node, the father node, and each of the child nodes of each of the number of single control trees can have a serial number.

In at least one embodiment, the establishing module 101 can set the serial number for the each node of each of the number of single control trees, according to an order of creating each of the number of single control trees. In at least one embodiment, the establishing module 101 can set the serial number of the root node of each of the number of single control trees to be a same number such as "0".

For example, it is assumed that the establishing module 101 establishes three single control trees for three applications of the motherboard 421. The three applications include an application "A", an application "B", and an application "C". As shown in FIG. 6, the establishing module 101 establishes a single control tree "A1" for the application "A". The establishing module 101 further sets a serial number "0" for the root node of the single control tree "A1", sets a serial number "1" for the father node of the single control tree "A1", and respectively sets serial numbers "11", "12", "13" for three child nodes of the single control tree "A1". Similarly, the establishing module 101 establishes a single control tree "B1" for the application "B". The establishing module 101 further sets the serial number "0" for the root node of the single control tree "B1", sets a serial number "2" for the father node of the single control tree "B1", and respectively sets serial numbers "21", "22", "23" for three child nodes of the single control tree "B1". Similarly, the establishing module 101 establishes a single control tree "C1" for the application "C". The establishing module 101 further sets the serial number "0" for the root node of the single control tree "C1", sets a serial number "3" for the father node of the single control tree "C1", and respectively sets serial numbers "31", "32", "33" for three child nodes of the single control tree "C1".

In at least one embodiment, when the establishing module 101 establishes the central control tree according to the tree structure, the establishing module 101 first merges all the root nodes of the number of single control trees to be one root node, and then merges each father node and merges each child node of each of the number of single control trees on one single control tree to obtain a merged control tree. The establishing module 101 can set the merged control tree to be the central control tree.

In at least one embodiment, the establishing module 101 can establish the central control tree by merging the number of single control trees according to the tree structure based upon the serial number of each node of each of the number of single control trees. In at least one embodiment, the establishing module 101 can merge the nodes having the same serial number to be one node. For example, the establishing module 101 can merge the root nodes having the same serial number "0" to be one root node of the central control tree. The establishing module 101 can further merge the father node and child nodes of each of the number of single control trees not having the same serial numbers on the central control tree.

Figure 7:
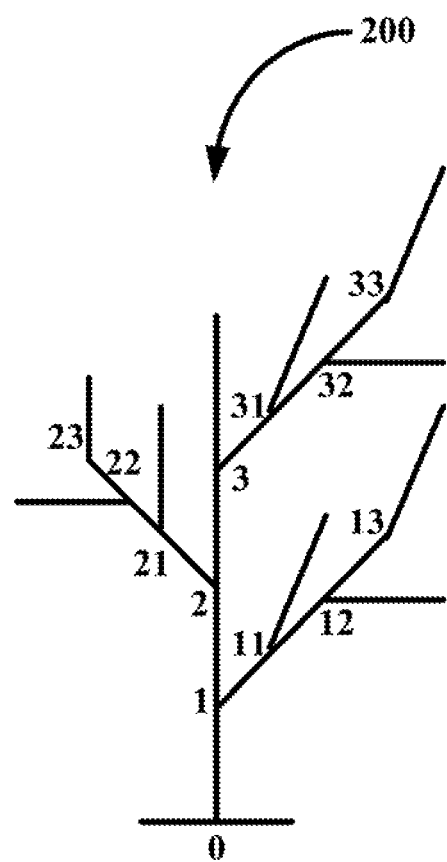
FIG. 7 illustrates an example of establishing a central control tree by the voice controlling system of FIG. 5.

For example, as shown in FIG. 7, the establishing module 101 can merge the single control trees "A1", "B1", and "C1" to be a central control tree 200 according to the tree structure, based upon the serial number of each node of each of the three single control trees "A1", "B1", and "C1".

In at least one embodiment, the establishing module 101 can display the central control tree on the display screen 432 in response to user's input, and adjust the central control tree in response to user's operations to the central control tree.

In at least one embodiment, the establishing module 101 can delete a single control tree corresponding to one of the number of applications from the central control tree. The establishing module 101 can also add to the central control tree a single control tree corresponding to a new application. The new application can be an application of the motherboard 421 of which a single control tree has not been added to the central control tree. For example, the new application may be a new application that is recently installed in the motherboard 421.

In at least one embodiment, when a first signal is received, the establishing module 101 can delete from the central control tree the single control tree corresponding to one of the number of applications. When a second signal is received, the establishing module 101 can add to the central control tree the single control tree corresponding to the new application. In at least one embodiment, the first signal is generated when the user touches a father node of a single control tree corresponding to one of the number of applications, for a predetermined time period (e.g., 5 seconds). The second signal is generated when the user double clicks the central control tree.

For one example, when the user touches the father node "2" corresponding to application "B" on the central control tree 200 for the predetermined time period, the establishing module 101 can issue a prompt for user to select whether a voice controlling method corresponding to the application "B" is to be deleted. If the voice controlling method corresponding to the application "B" is determined to be deleted in response to user's input, the establishing module 101 can delete the father node and child nodes corresponding to the application "B" from the central control tree 200. That is, the signal control tree "B1" corresponding to the application "B" is deleted from the central control tree 200.

For another example, when the user double clicks on the central control tree 200, the establishing module 101 can display all applications of the motherboard 421 which have single control trees not added to the central control tree 200 on the display screen 432. The establishing module 101 can determine which application is selected by the user, and set text information corresponding to the selected application and text information corresponding to each of function options of the selected application. The establishing module 101 can create a father node on the central control tree 200, and establish a relationship between the father node and the text information corresponding to the selected application. The establishing module 101 can create a number of child notes for the father node according to the function options of the selected application. The establishing module 101 can further establish a relationship between each of the child nodes and the text information of each of the function options of the selected application. In at least one embodiment, the establishing module 101 can further set a serial number for the father node and each of the child nodes corresponding to the selected application.

In at least one embodiment, when a single control tree of one of the number of applications is deleted from the central control tree, the establishing module 101 can correspondingly adjust the serial numbers of other applications of the number of applications on the central control tree.

For example, when the single control tree corresponding to the application "B" is deleted from the central control tree 200, the establishing module 101 can adjust the serial number of the father node corresponding to the application "C" by replacing "3" with "2", and adjust the serial number of the child nodes corresponding to the application "C" by respectively replacing "31", "32", and "33" with "21", "22", and "23".

In at least one embodiment, the obtaining module 102 can obtain voice data.

In at least one embodiment, the obtaining module 102 can obtain the voice data from the voice inputting device 412 when the airflow sensor 416 detects airflow of the mouth or nose of the user.

It should be noted that the obtaining module 102 obtains the voice data when the airflow of the mouth or nose of the user is detected, is to avoid mistakenly obtaining voice data of people except the user who are around the motherboard 421. In other words, more accurate voice data can be obtained if the obtaining module 102 obtains the voice data when the airflow of the mouth or nose of the user is detected.

In other embodiments, the obtaining module 102 can directly obtain the voice data from the voice inputting device 412. In other words, the obtaining module 102 may not require airflow of the mouth or nose of the user to be detected as a precondition for obtaining voice. The motherboard 421 may not include the airflow sensor 416.

In at least one embodiment, the voice inputting device 412 can be a microphone that is internally or externally connected to the motherboard 421. In other embodiments, the voice inputting device 412 can also be an earpiece microphone that is configured on an earphone, which is connected to the motherboard 421.

In at least one embodiments, the obtaining module 102 can further de-noise noise in the obtained voice data to obtain de-noised voice data.

In at least one embodiment, the obtaining module 102 can de-noise the noise in the obtained voice data using an anti-aliasing filter, a pre-emphasis filter, and/or an end point detector.

In at least one embodiments, the recognizing module 103 can recognize the de-noised voice data to obtain recognized voice data. It should be noted that if the obtained voice data is not de-noised, the recognizing module 103 can also recognize the obtained voice data that is not de-noised.

In at least one embodiment, the recognized voice data is obtained by converting the de-noised voice data to text information. In other words, the recognized voice data is the converted text information. In at least one embodiments, the recognizing module 103 can convert the de-noised voice data to the text information using a voice recognizing technology.

In at least one embodiments, the controlling module 104 can control an operation of the motherboard 421 according to the central control tree based upon the recognized voice data.

In at least one embodiment, the controlling module 104 can determine whether there is a node of the central control tree corresponding to the converted text information, by comparing the converted text information with the text information corresponding to each node of the central control tree. When the converted text information matches the text information corresponding one node of the central control tree, the controlling module 104 can determine the one node of the central control tree which corresponds to the converted text information, and obtain a determined node. The controlling module 104 can trigger a function corresponding to the determined node.

In at least one embodiment, when the determined node is the root node of the central control tree, the controlling module 104 controls the motherboard 421 to execute a first function, such as power off the motherboard 421, or boot the motherboard 421, or lock the motherboard 421, or control the motherboard 421 to enter a sleep state.

In at least one embodiment, when the determined node is a father node of the central control tree, the controlling module 104 controls the motherboard 421 to run the application corresponding to the father node.

For one example, when the determined node is the father node "1" of the central control tree, and the father node "1" corresponds to the telephone application, the controlling module 104 can control the motherboard 421 to run the telephone application.

For another example, when the application corresponding to the father node is run, the controlling module 104 can further broadcast text information corresponding to each of the child nodes of the father node using voices. Then the user can know which function options are included in the application. The obtaining module 102 can further obtain current voice data. The recognizing module 103 can further convert the current voice data to current text information. The controlling module 104 can further determine a current child node corresponding to the current text information by comparing the current text information with the text information of each of the child nodes of the father node. The controlling module 104 can further trigger a function corresponding to the current child node.

For example, when the telephone application of the electronic device is run, the controlling module 104 broadcasts the text information of the function options of the telephone application such as "make a call", "query received calls", "query answered calls", and the "query missed calls" using voices. When the recognizing module 103 recognizes the text information of the current voice data obtained from the voice inputting device 412 is the "query missed calls", the controlling module 104 controls the telephone application to list phone numbers of all missed calls, and display all the phone numbers on the display screen 432.

In at least one embodiment, when one application such as a music player of the motherboard 421 is run, if the motherboard 421, through the SIM card installed in the card slot 415, receives an incoming call from another electronic device, the controlling module 104 can broadcast the incoming call using voices, and determine whether to answer the incoming call or not according to voice data inputted by the user.

Figure 8:
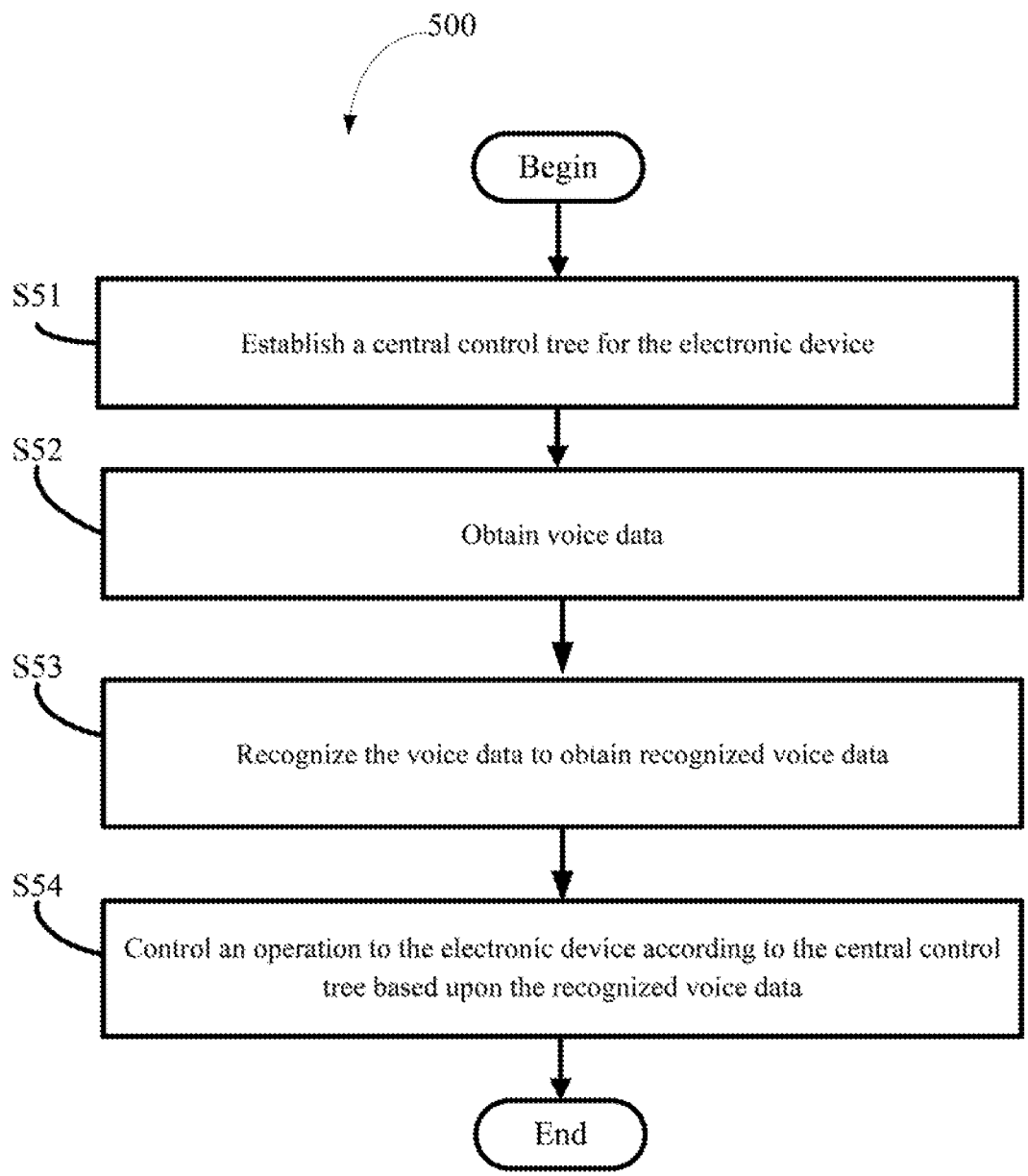
FIG. 8 illustrates a flowchart of one embodiment of a method for controlling the smart cap by the voice controlling system of FIG. 5.

FIG. 8 illustrates a flowchart which is presented in accordance with an example embodiment. The example method 500 is provided by way of example, as there are a variety of ways to carry out the method. The method 500 described below can be carried out using the configurations illustrated in FIGS. 1-4, for example, and various elements of these figures are referenced in explaining example method 500. Each block shown in FIG. 8 represents one or more processes, methods, or subroutines, carried out in the exemplary method 500. Additionally, the illustrated order of blocks is by example only and the order of the blocks can be changed according to the present disclosure. The exemplary method 500 can begin at block 51. Depending on the embodiment, additional steps can be added, others removed, and the ordering of the steps can be changed.

At block 51, the establishing module 101 can establish a central control tree for the motherboard 421.

In at least one embodiment, the establishing module 101 can establish a single control tree for each of the number of applications of the motherboard 421, to obtain a number of single control trees. The establishing module 101 can further establish the central control tree by merging the number of single control trees according to a tree structure.

In at least one embodiment, a single control tree can be defined to be a rule used for controlling an application of the motherboard 421. Similarly, the central control tree can be defined to be a rule used for controlling operations performed by the motherboard 421. The rules can be set according to the tree structure that may be defined by a trunk of a tree, one or more branches of the trunk, and one or more leaves of each of the one or more branches.

In at least one embodiment, the establishing module 101 establishes the number of single control trees according to the following four steps.

First, the establishing module 101 sets first text information corresponding to a first function of the motherboard 421. The establishing module 101 creates a root node of a single control tree, and establishes a first relationship between the root node and the first text information.

In at least one embodiment, the first function includes, but is not limited to, a function of powering off the motherboard 421, a function of rebooting the motherboard 421, a function of locking the motherboard 421, a function of controlling the motherboard 421 to enter a sleep state, and the like. In other embodiments, the first function can be executed after a predetermined time period such as 5 minutes.

In at least one embodiment, the first text information can be information describing the first function. For example, when the first function is power off the motherboard 421, the first text information can be such as "power off the motherboard". In at least one embodiment, the establishing module 101 can set the first text function according to user's requirement. For example, the establishing module 101 can set the first text function in response to user's input through the display screen 432.

In at least one embodiment, the establishing module 101 can provide the user a setting interface for setting the first function and the corresponding first text information.

For example, on the setting interface, the user can set the first function including locking the display screen 432 of the motherboard 421. The user can further set the first text information including text "lock display screen".

Second, the establishing module 101 can set second text information corresponding to one of the number of applications. The establishing module 101 can further create a father node of the single control tree, and establish a second relationship between the second text information and the father node.

In at least one embodiment, the establishing module 101 can display icons of the number of applications on the setting interface when the first relationship is established. The establishing module 101 can set one of the number of applications is selected by the user in response to touch input received from the display screen 432.

In at least one embodiment, the establishing module 101 can set a name of the selected application to be text information corresponding to the selected application. For example, when the user selects the telephone application, the establishing module 101 can set "telephone" as the text information corresponding to the telephone application.

Third, the establishing module 101 can set a number of function options of the one of the number of applications, and set third text information corresponding to each of the number of function options. The establishing module 101 can create a number of child nodes for the father node according to a number of the number of function options. In at least one embodiment, a quantity of the number of the child nodes equals the quantity of the number of function options. The establishing module 101 can further establish a third relationship between each of the number of child node and corresponding third text information.

In at least one embodiment, when the second relationship is established, the establishing module 101 can display the number of function options on the setting interface, and determine the third text information corresponding to each of the number of function options, in response to user's input. In other embodiments, the establishing module 101 can determine a name of each of the number of function options to be the corresponding third text information.

For example, it is assumed that the telephone application is selected by the user. When the second relationship is established, the establishing module 101 can display the number of function options of the telephone application on the setting interface. The number of functions options of the telephone application may include, but is not limited to, a first function option of making a call, a second function option of querying all received calls, a third function option of querying all answered calls, and a fourth function option of querying missed calls. The establishing module 101 can set "make call" as the text information corresponding to the first function option. Similarly, the establishing module 101 can set "query received calls" as the text information corresponding to the second function option, set "query answered calls" as the text information corresponding to the third function option, and set "query missed calls" as the text information corresponding to the fourth function option.

Fourth, the establishing module 101 can establish a single control tree for each of other applications of the number of applications according to the above steps. Therefore, the establishing module 101 can obtain the number of single control trees, each of which corresponds to one of the number of the applications.

In at least one embodiment, the establishing module 101 can further set a serial number for each node (i.e., the root node, the father node, the child nodes) of each of the number of single control trees. In other words, the root node, the father node, and each of the child nodes of each of the number of single control trees can have a serial number.

In at least one embodiment, the establishing module 101 can set the serial number for the each node of each of the number of single control trees, according to an order of creating each of the number of single control trees. In at least one embodiment, the establishing module 101 can set the serial number of the root node of each of the number of single control trees to be a same number such as "0".

For example, it is assumed that the establishing module 101 establishes three single control trees for three applications of the motherboard 421. The three applications include an application "A", an application "B", and an application "C". As shown in FIG. 6, the establishing module 101 establishes a single control tree "A1" for the application "A". The establishing module 101 further sets a serial number "0" for the root node of the single control tree "A1", sets a serial number "1" for the father node of the single control tree "A1", and respectively sets serial numbers "11", "12", "13" for three child nodes of the single control tree "A1". Similarly, the establishing module 101 establishes a single control tree "B1" for the application "B". The establishing module 101 further sets the serial number "0" for the root node of the single control tree "B1", sets a serial number "2" for the father node of the single control tree "B1", and respectively sets serial numbers "21", "22", "23" for three child nodes of the single control tree "B1". Similarly, the establishing module 101 establishes a single control tree "C1" for the application "C". The establishing module 101 further sets the serial number "0" for the root node of the single control tree "C1", sets a serial number "3" for the father node of the single control tree "C1", and respectively sets serial numbers "31", "32", "33" for three child nodes of the single control tree "C1".

In at least one embodiment, when the establishing module 101 establishes the central control tree according to the tree structure, the establishing module 101 first merges all the root nodes of the number of single control trees to be one root node, and then merges each father node and merges each child node of each of the number of single control trees on one single control tree to obtain a merged control tree. The establishing module 101 can set the merged control tree to be the central control tree.

In at least one embodiment, the establishing module 101 can establish the central control tree by merging the number of single control trees according to the tree structure based upon the serial number of each node of each of the number of single control trees. In at least one embodiment, the establishing module 101 can merge the nodes having the same serial number to be one node. For example, the establishing module 101 can merge the root nodes having the same serial number "0" to be one root node of the central control tree. The establishing module 101 can further merge the father node and child nodes of each of the number of single control trees not having the same serial numbers on the central control tree.

For example, as shown in FIG. 7, the establishing module 101 can merge the single control trees "A1", "B1", and "C1" to be a central control tree 200 according to the tree structure, based upon the serial number of each node of each of the three single control trees "A1", "B1", and "C1".

In at least one embodiment, the establishing module 101 can display the central control tree on the display screen 432 in response to user's input, and adjust the central control tree in response to user's operations to the central control tree.

In at least one embodiment, the establishing module 101 can delete a single control tree corresponding to one of the number of applications from the central control tree. The establishing module 101 can also add to the central control tree a single control tree corresponding to a new application. The new application can be an application of the motherboard 421 of which a single control tree has not been added to the central control tree. For example, the new application may be a new application that is recently installed in the motherboard 421.

In at least one embodiment, when a first signal is received, the establishing module 101 can delete from the central control tree the single control tree corresponding to one of the number of applications. When a second signal is received, the establishing module 101 can add to the central control tree the single control tree corresponding to the new application. In at least one embodiment, the first signal is generated when the user touches a father node of a single control tree corresponding to one of the number of applications, for a predetermined time period (e.g., 5 seconds). The second signal is generated when the user double clicks the central control tree.

For one example, when the user touches the father node "2" corresponding to application "B" on the central control tree 200 for the predetermined time period, the establishing module 101 can issue a prompt for user to select whether a voice controlling method corresponding to the application "B" is to be deleted. If the voice controlling method corresponding to the application "B" is determined to be deleted in response to user's input, the establishing module 101 can delete the father node and child nodes corresponding to the application "B" from the central control tree 200. That is, the signal control tree "B1" corresponding to the application "B" is deleted from the central control tree 200.

For another example, when the user double clicks on the central control tree 200, the establishing module 101 can display all applications of the motherboard 421 which have single control trees not added to the central control tree 200 on the display screen 432. The establishing module 101 can determine which application is selected by the user, and set text information corresponding to the selected application and text information corresponding to each of function options of the selected application. The establishing module 101 can create a father node on the central control tree 200, and establish a relationship between the father node and the text information corresponding to the selected application. The establishing module 101 can create a number of child notes for the father node according to the function options of the selected application. The establishing module 101 can further establish a relationship between each of the child nodes and the text information of each of the function options of the selected application. In at least one embodiment, the establishing module 101 can further set a serial number for the father node and each of the child nodes corresponding to the selected application.

In at least one embodiment, when a single control tree of one of the number of applications is deleted from the central control tree, the establishing module 101 can correspondingly adjust the serial numbers of other applications of the number of applications on the central control tree.

For example, when the single control tree corresponding to the application "B" is deleted from the central control tree 200, the establishing module 101 can adjust the serial number of the father node corresponding to the application "C" by replacing "3" with "2", and adjust the serial number of the child nodes corresponding to the application "C" by respectively replacing "31", "32", and "33" with "21", "22", and "23".

At block 52, the obtaining module 102 can obtain voice data.

In at least one embodiment, the obtaining module 102 can obtain the voice data from the voice inputting device 412 when the airflow sensor 416 detects airflow of the mouth or nose of the user.

It should be noted that the obtaining module 102 obtains the voice data when the airflow of the mouth or nose of the user is detected, is to avoid mistakenly obtaining voice data of people except the user who are around the motherboard 421. In other words, more accurate voice data can be obtained if the obtaining module 102 obtains the voice data when the airflow of the mouth or nose of the user is detected.

In other embodiments, the obtaining module 102 can directly obtain the voice data from the voice inputting device 412. In other words, the obtaining module 102 may not require airflow of the mouth or nose of the user to be detected as a precondition for obtaining voice. The motherboard 421 may not include the airflow sensor 416.

In at least one embodiment, the voice inputting device 412 can be a microphone that is internally or externally connected to the motherboard 421. In other embodiments, the voice inputting device 412 can also be an earpiece microphone that is configured on an earphone, which is connected to the motherboard 421.

In at least one embodiments, the obtaining module 102 can further de-noise noise in the obtained voice data to obtain de-noised voice data.

In at least one embodiment, the obtaining module 102 can de-noise the noise in the obtained voice data using an anti-aliasing filter, a pre-emphasis filter, and/or an end point detector.

At block 53, the recognizing module 103 can recognize the de-noised voice data to obtain recognized voice data. It should be noted that if the obtained voice data is not de-noised, the recognizing module 103 can also recognize the obtained voice data that is not de-noised.

In at least one embodiment, the recognized voice data is obtained by converting the de-noised voice data to text information. In other words, the recognized voice data is the converted text information. In at least one embodiments, the recognizing module 103 can convert the de-noised voice data to the text information using a voice recognizing technology.

At block 54, the controlling module 104 can control an operation of the motherboard 421 according to the central control tree based upon the recognized voice data.

In at least one embodiment, the controlling module 104 can determine whether there is a node of the central control tree corresponding to the converted text information, by comparing the converted text information with the text information corresponding to each node of the central control tree. When the converted text information matches the text information corresponding one node of the central control tree, the controlling module 104 can determine the one node of the central control tree which corresponds to the converted text information, and obtain a determined node. The controlling module 104 can trigger a function corresponding to the determined node.

In at least one embodiment, when the determined node is the root node of the central control tree, the controlling module 104 controls the motherboard 421 to execute a first function, such as power off the motherboard 421, or boot the motherboard 421, or lock the motherboard 421, or control the motherboard 421 to enter a sleep state.

In at least one embodiment, when the determined node is a father node of the central control tree, the controlling module 104 controls the motherboard 421 to run the application corresponding to the father node.

For one example, when the determined node is the father node "1" of the central control tree, and the father node "1" corresponds to the telephone application, the controlling module 104 can control the motherboard 421 to run the telephone application.

For another example, when the application corresponding to the father node is run, the controlling module 104 can further broadcast text information corresponding to each of the child nodes of the father node using voices. Then the user can know which function options are included in the application. The obtaining module 102 can further obtain current voice data. The recognizing module 103 can further convert the current voice data to current text information. The controlling module 104 can further determine a current child node corresponding to the current text information by comparing the current text information with the text information of each of the child nodes of the father node. The controlling module 104 can further trigger a function corresponding to the current child node.

For example, when the telephone application of the electronic device is run, the controlling module 104 broadcasts the text information of the function options of the telephone application such as "make a call", "query received calls", "query answered calls", and the "query missed calls" using voices. When the recognizing module 103 recognizes the text information of the current voice data obtained from the voice inputting device 412 is the "query missed calls", the controlling module 104 controls the telephone application to list phone numbers of all missed calls, and display all the phone numbers on the display screen 432.

In at least one embodiment, when one application such as a music player of the motherboard 421 is run, if the motherboard 421, through the SIM card installed in the card slot 415, receives an incoming call from another electronic device, the controlling module 104 can broadcast the incoming call using voices, and determine whether to answer the incoming call or not according to voice data inputted by the user.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A smart cap comprising a fixing sleeve, a brim portion, and a sun visor, the fixing sleeve being rotatably connected with one side of the brim portion, and the sun visor being connected with another side of the brim portion, the another side of the brim portion being relative to the one side of the brim portion,
   wherein the fixing sleeve comprises a voice inputting device, a voice outputting device, and a communication device, a motherboard is configured on the brim portion, an upper surface of the sun visor is configured with a solar charging battery, and a lower surface of the sun visor is configured with a display screen, the solar charging battery is configured to provide power for the voice inputting device, the voice outputting device, the motherboard, and the display screen via a power management device set on the fixing sleeve,
   wherein the fixing sleeve further comprises a card slot for installing a subscriber identity module (SIM) card.

2. The smart cap according to claim 1, wherein the sun visor is extended from the another side of the brim portion.

3. The smart cap according to claim 1, wherein at least one light emitting diode (LED) light is configured on the brim portion.

4. The smart cap according to claim 1, wherein a camera and at least one light emitting diode (LED) light is configured on the sun visor.

5. The smart cap according to claim 1, wherein a button for activating the motherboard is set on the lower surface of the sun visor.

6. The smart cap according to claim 1, wherein the display screen is a touch screen.

7. The smart cap according to claim 1, wherein the fixing sleeve comprises two projections which are respectively configured on two end of the fixing sleeve, each projection has a groove, a hole is opened on each end of the fixing sleeve to connect with the groove, two tail ends of the brim portion are respectively inserted in the grooves, a hole is opened on each tail end of the brim portion, the brim portion and the fixing sleeve is connected to each other by inserting a connecting pin into the hole of the brim portion and the hole of the fixing sleeve.

8. The smart cap according to claim 7, wherein each projection is further configured with a protective cover.

9. The smart cap according to claim 1, wherein at least one of the two ends of the fixing sleeve is configured with a charge interface, the charge interface connects with a charge battery that is configured on the fixing sleeve, the charge battery is configured to provide power for all components of the smart cap through the power management device.

10. A method for controlling a smart cap being executed by a processor of a motherboard that is configured on the smart cap, the smart cap comprising a display screen, the method comprising:
    establishing a central control tree for the motherboard, wherein the central control tree comprises a plurality of single control trees;
    obtaining voice data;
    recognizing the voice data to obtain recognized voice data; and
    controlling an operation to the motherboard according to the central control tree based upon the recognized voice data;
    wherein the method further comprises adjusting the central control tree by:
    detecting touch input on the display screen when the display screen is contacted by a user;
    displaying the central control tree on the display screen in response to user's touch input; and
    adjusting the central control tree in response to the user's touch input.

11. The method according to claim 10, further comprising:
    detecting airflow of the user using an airflow sensor of the smart cap before the obtaining of the voice data, wherein the obtaining of the voice data is executed when the airflow sensor detects airflow; and
    de-noising noise in the voice data.

12. The method according to claim 10, wherein the central control tree is established by:
    establishing a single control tree for each of a plurality of applications of the motherboard, and obtaining a plurality of single control trees; and
    merging the plurality of single control trees to obtain the central control tree.

13. The method according to claim 12, wherein plurality of single control trees are obtained by:
    (a) determining first text information corresponding to a first function of the motherboard, creating a root node of a single control tree and establishing a first relationship between the root node and the first text information;
    (b) determining second text information corresponding to one of a plurality of applications, creating a father node of the single control tree, and establishing a second relationship between the second text information and the father node;
    (C) determining third text information corresponding to each of a plurality of function options of the one of the plurality of applications, creating a plurality of child nodes for the father node according to a number of the plurality of function options, and establishing a third relationship between each of the plurality of child nodes and corresponding third text information; and establishing a single control tree for each of other applications of the plurality of applications according to the steps (a)-(c), to obtain the plurality of single control trees each of which corresponds to one of the plurality of the applications.

14. The method according to claim 13, wherein the first function is selected from the group consisting powering off the motherboard, rebooting the motherboard, locking the motherboard, and controlling the motherboard to enter a sleep state.

15. The method according to claim 14, further comprising:

converting the voice data to text information to obtain converted text information using a voice recognizing technology;

determining a node of the central control tree corresponding to the converted text information by comparing the converted text information with text information of each node of the central control tree; and triggering a function corresponding to the determined node.

16. The method according to claim 15, further comprising:

when the determined node is a father node of the central control tree, obtaining a determined father node and running an application corresponding to the determined father node; and broadcasting text information corresponding to each of child nodes of the determined father node.

17. The method according to claim 16, further comprising:

obtaining current voice data;

converting the current voice data to current text information;

determining a current child node corresponding to the current text information by comparing the current text information with the text information of each of the child nodes of the determined father node; and triggering a function corresponding to the current child node.

18. The method according to claim 13, further comprising:

setting a serial number for each node of each of the plurality of single control trees, wherein the root node of each of the plurality of single control trees has a same serial number.

19. The method according to claim 18, wherein the central control tree is obtained by:

merging all the root nodes of the plurality of single control trees to be one root node;

merging each father node and each child node of each of the plurality of single control trees on one single control tree to obtain a merged control tree; and determining the merged control tree to be the central control tree.

20. The method according to claim 19, further comprising:

displaying the central control tree on a display screen of the smart cap in response to user's input;

deleting a single control tree corresponding to one of the plurality of applications from the central control tree in response to a first signal; and adding a single control tree corresponding to a new application to the central control tree in response to a second signal.

* * * * *